(12) United States Patent
Kang et al.

(10) Patent No.: US 12,235,498 B2
(45) Date of Patent: Feb. 25, 2025

(54) MANUFACTURING METHOD AND APPLICATION OF OPTICAL INTERCONNECTION MODULE

(71) Applicant: ELECTRONICS AND TELECOMMUNICATIONS RESEARCH INSTITUTE, Daejeon (KR)

(72) Inventors: Sae-Kyoung Kang, Daejeon (KR); Joon Young Huh, Daejeon (KR); Joon Ki Lee, Sejong-si (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 185 days.

(21) Appl. No.: 17/575,981

(22) Filed: Jan. 14, 2022

(65) Prior Publication Data
US 2022/0317395 A1    Oct. 6, 2022

(30) Foreign Application Priority Data

Apr. 5, 2021  (KR) .................... 10-2021-0043861
Jul. 12, 2021  (KR) .................... 10-2021-0091086

(51) Int. Cl.
*G02B 6/42*   (2006.01)

(52) U.S. Cl.
CPC ......... *G02B 6/4272* (2013.01); *G02B 6/4239* (2013.01); *G02B 6/4243* (2013.01); *G02B 6/4245* (2013.01); *G02B 6/4283* (2013.01)

(58) Field of Classification Search
CPC .. G02B 6/4272; G02B 6/4239; G02B 6/4243; G02B 6/4245; G02B 6/4283
See application file for complete search history.

(56) References Cited

U.S. PATENT DOCUMENTS

| 8,355,612 B2 | 1/2013 | Kang et al. |
| 9,857,535 B2 | 1/2018 | Heo et al. |
| 2003/0156400 A1* | 8/2003 | Dibene, II ......... H01R 12/7088 257/E23.09 |
| 2018/0180808 A1* | 6/2018 | Zhang .................. G02B 6/4274 |

(Continued)

FOREIGN PATENT DOCUMENTS

| KR | 10-2018-0122311 A | 11/2018 |
| KR | 10-2020-0001552 A | 1/2020 |

(Continued)

*Primary Examiner* — Sung H Pak
*Assistant Examiner* — Hoang Q Tran
(74) *Attorney, Agent, or Firm* — LRK PATENT LAW FIRM

(57) ABSTRACT

A manufacturing method and application of an optical interconnection module are disclosed. According to example embodiments, by providing the method of manufacturing the optical interconnection module in which an optical fiber optical coupler is disposed at its lower portion by using the FOWLP process, it is possible to provide advantages such as lightness, thinness and compactness of the optical interconnection module, guarantee of signal integrity, and high yield in mass production. Further, it is possible to provide a structure providing an electrical ground to an electronic chip by mounting the electronic chip on ETB and capable of being used as a heat dissipation path.

17 Claims, 12 Drawing Sheets

(56) References Cited

U.S. PATENT DOCUMENTS

| | | | |
|---|---|---|---|
| 2018/0275359 A1 | 9/2018 | Ding et al. | |
| 2019/0285804 A1* | 9/2019 | Ramachandran | G02B 6/421 |
| 2020/0319416 A1* | 10/2020 | Patel | G02B 6/4248 |
| 2020/0389968 A1 | 12/2020 | Chen et al. | |
| 2021/0055487 A1 | 2/2021 | Zhai et al. | |
| 2022/0179159 A1* | 6/2022 | Wu | G02B 6/4204 |

FOREIGN PATENT DOCUMENTS

| | | |
|---|---|---|
| KR | 10-2021-0035058 A | 3/2021 |
| WO | 2019/073801 A1 | 4/2019 |

* cited by examiner

MANUFACTURING METHOD AND APPLICATION OF OPTICAL INTERCONNECTION MODULE

CROSS-REFERENCE TO RELATED APPLICATIONS

This application claims the benefit of Korean Patent Application No. 10-2021-0043861 filed on Apr. 5, 2021, and Korean Patent Application No. 10-2021-0091086 filed on Jul. 12, 2021, in the Korean Intellectual Property Office, the entire disclosures of which are incorporated herein by reference for all purposes.

BACKGROUND

1. Field of the Invention

One or more example embodiments relate to a manufacturing method and application of an optical interconnection module which functions as an optical transmission/reception interface in a data center network.

2. Description of Related Art

An optical interconnection module receives electrical signals and modulates the electrical signals into optical signals, and receives optical signals and converts the optical signals into electrical signals. The optical interconnection module is responsible for optical connection for high-speed signal transmission in data centers and high-performance computing. As data capacity to be transmitted through the optical interconnection module increases, there is a demand for a high-speed, miniaturized, and low-cost optical transmitter and optical receiver, which are core blocks.

To this end, the optical interconnection module may be implemented by integrating optical devices and electronic devices for optical transmission and reception in a limited space. For such an optical interconnection module, a technology of arranging an optical fiber optical coupler as close as possible to an input/output of a switching electronic device or an electronic device operating at high speed to connect via light is being actively studied.

In particular, in the case that the capacity of a switching chip in the data center evolves to 51 Tbps/102 Tbps or more, it is predicted that, in pluggable optics, which are mounted on a faceplate of an existing line card, a co-packaged optics (CPO)-level optical interconnection module that is disposed closest to a switching chip and mounted on the same switching chip package substrate will be required.

RELATED ART DOCUMENT (Patent Document 1) U.S. Patent Application Publication No. 2020/0389968 (Dec. 10, 2020)

SUMMARY

Example embodiments provide a method of manufacturing an optical interconnection module in which an optical fiber optical coupler is disposed at its lower portion by using a Fan-Out Wafer-Level Packaging (hereinafter, referred to as FOWLP) process.

In addition, example embodiments provide a structure providing an electrical ground to an electronic chip by mounting the electronic chip on an electrical and thermal bench (hereinafter, also referred to as ETB) and capable of being used as a heat dissipation path.

According to an aspect, there is provided a method of manufacturing an optical interconnection module in which an optical fiber optical coupler is disposed at its lower portion using a Fan-Out Wafer-Level Packaging (FOWLP) process, the method including mounting an electronic chip using an electrical and thermal bench (ETB) disposed in a first area on a temporary wafer on which an adhesive layer is formed; mounting a photonics chip having a groove region formed therein in a second area on the temporary wafer; performing an epoxy molding compound (EMC) process on the electronic chip and the photonics chip mounted on the temporary wafer; after removing the temporary wafer from the electronic chip and the photonics chip on which the EMC process has been performed and forming a dielectric layer in the removed region, forming a ReDistribution Layer (RDL) on the formed dielectric layer; opening a side of the photonics chip on which the EMC process has been performed by performing dicing using the groove region formed in the photonics chip; and connecting an optical fiber optical coupler to the open side of the photonics chip.

The mounting of the electronic chip may include mounting an electronic chip belonging to an optical transmitter and an electronic chip belonging to an optical receiver on separate ETBs, respectively.

The ETB on which the electronic chip is mounted may provide an electrical ground and a heat dissipation path for the electronic chip through the RDL.

The forming of the RDL may include forming the RDL such that the groove region and an edge coupler included in the photonics chip are opened in bottoms of the electronic chip and the photonics chip on which the EMC process has been performed.

The mounting of the photonics chip may include forming a groove region with all sides closed in an end region of an edge coupler included in the photonics chip and mounting the photonics chip having the groove region.

The opening of the side of the photonics chip may include opening one side of the groove region by dicing to remove a groove stop region between the groove region with all the sides closed and an epoxy molding surrounding the photonics chip.

The mounting of the photonics chip may include forming a groove region with one side open in an end region of an edge coupler included in the photonics chip and embedding a polymer material having solubility in a predetermined solvent in the formed groove region and mounting the photonics chip having the groove region.

The opening of the side of the photonics chip may include opening one side of the groove region by dicing to remove the epoxy molding existing on the one side of the groove region from which an polymer material is removed during the forming of the RDL.

The connecting of the optical fiber optical coupler may include connecting the optical fiber optical coupler to the open side of the photonics chip by using V-grooves for optical alignment existing on both sides of the groove region formed in the photonics chip.

The optical fiber optical coupler may be implemented as a fiber array block (FAB) in which a plurality of optical fibers are arranged at regular intervals or as a silica-based planar lightwave circuit (PLC).

The method may further include disposing a thermal interface material (TIM) and a lid for heat dissipation of the electronic chip in an optical interconnection module to which the optical fiber optical coupler is connected.

According to another aspect, there is provided a method for manufacturing an optical interconnection module in which an optical fiber optical coupler is disposed at its lower portion using a Fan-Out Wafer-Level Packaging (FOWLP) process, the method including mounting an electronic chip using an electrical and thermal bench (ETB) disposed in a first area on a temporary wafer on which an adhesive layer is formed; mounting a photonics chip in a second area on the temporary wafer; performing an epoxy molding compound (EMC) process on the electronic chip and the photonics chip mounted on the temporary wafer; after removing the temporary wafer from the electronic chip and the photonics chip on which the EMC process has been performed and forming a dielectric layer in the removed region, forming a ReDistribution Layer (RDL) on the formed dielectric layer; and connecting an optical fiber optical coupler toward a lower surface of the photonics chip using a surface coupler included in the photonics chip.

The mounting of the electronic chip may include mounting an electronic chip belonging to an optical transmitter and an electronic chip belonging to an optical receiver on separate ETBs, respectively.

The ETB on which the electronic chip is mounted may provide an electrical ground and a heat dissipation path for the electronic chip through the RDL.

The forming of the RDL may include forming the RDL such that a groove region and an edge coupler included in the photonics chip are opened in bottoms of the electronic chip and the photonics chip on which the EMC process has been performed.

The optical fiber optical coupler may be implemented as a fiber array block (FAB) in which a plurality of optical fibers are arranged at regular intervals or as a silica-based planar lightwave circuit (PLC).

The method may further include disposing a thermal interface material (TIM) and a lid for heat dissipation of the electronic chip in an optical interconnection module to which the optical fiber optical coupler is connected.

According to another aspect, there is provided a package substrate for an optical interconnection module in which an optical fiber optical coupler is disposed at its lower portion, the package substrate including a hole for a socket, the hole having one side open for an optical fiber optical coupler; and a signal pad for connection of the optical interconnection module. The optical interconnection module in which the optical fiber optical coupler is disposed at its lower portion may be connected to the signal pad using a hole formed in the package substrate to be connected to a host chip mounted on the package substrate by high-speed optical connection.

Additional aspects of example embodiments will be set forth in part in the description which follows and, in part, will be apparent from the description, or may be learned by practice of the disclosure.

According to example embodiments, by providing a method of manufacturing an optical interconnection module in which an optical fiber optical coupler is disposed at its lower portion by using the FOWLP process, it is possible to provide advantages such as lightness, thinness and compactness of the optical interconnection module, guarantee of signal integrity, and high yield in mass production.

Further, according to example embodiments, it is possible to provide a structure providing an electrical ground to an electronic chip by mounting the electronic chip on ETB and capable of being used as a heat dissipation path.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Hereinafter, example embodiments will be described in detail with reference to the accompanying drawings.

Figure 1:
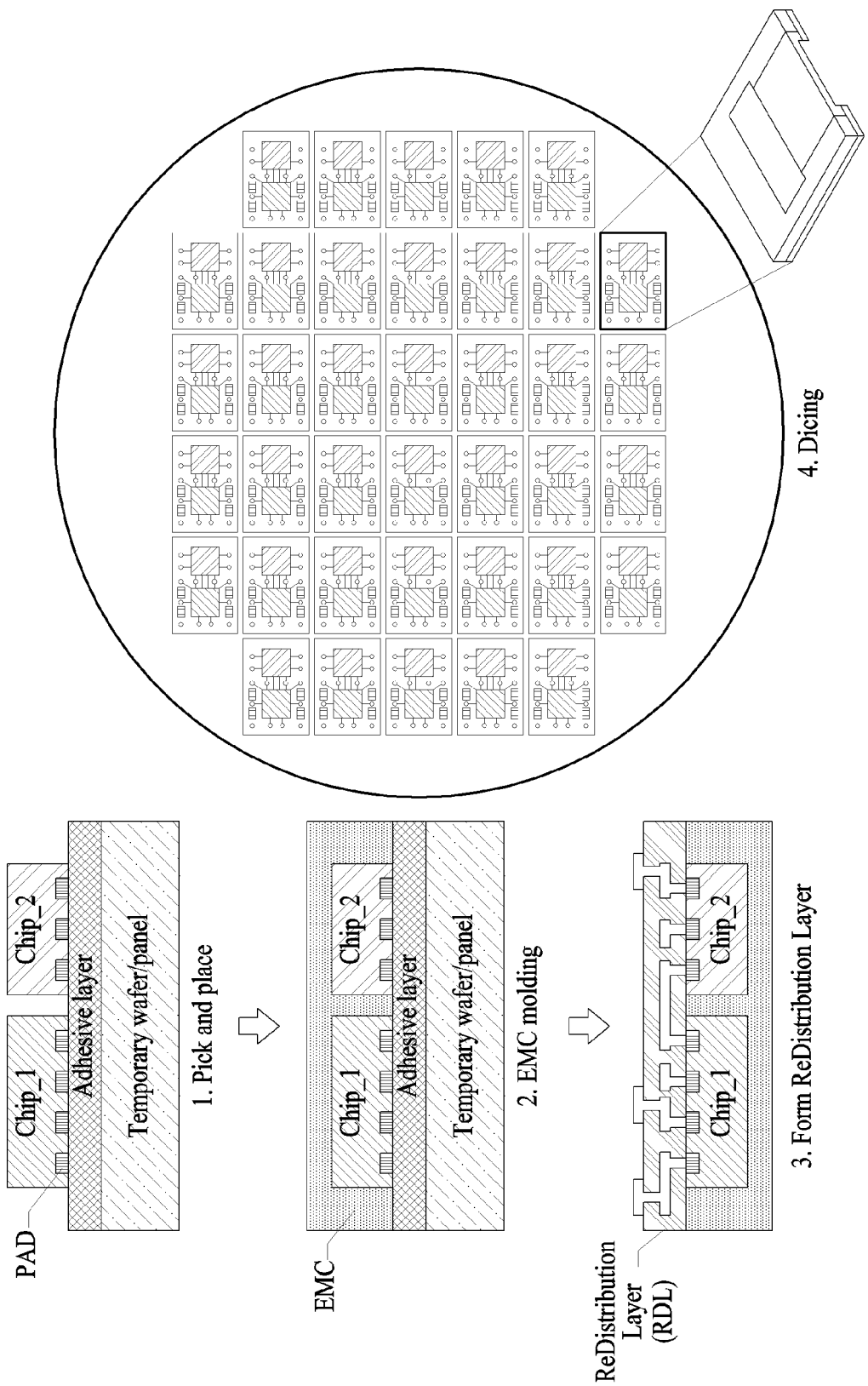
FIG. 1 is a diagram illustrating a FOWLP process used in the present disclosure.

FIG. 1 is a diagram illustrating a FOWLP process used in the present disclosure.

The present disclosure relates to a manufacturing method and application of a silicon photonics-based optical interconnection module. More specifically, the present disclosure provides a structure of an optical interconnection module in which an electronic device and an optical device (a silicon photonics-based optical transceiver device) are packaged by applying the FOWLP process, which is a packaging technology emerging in the field of semiconductor packaging technology.

This FOWLP process uses a known-good die (KGD) with proven performance and does not use an interposer or substrate, so it can have advantages such as high yield, miniaturization, and cost reduction. Further, the FOWLP process may have advantages in reliability and signal integrity as electrical connection is made through formation of a polymer layer and a copper wiring layer instead of electrical connection by conventional wire bonding.

In order to apply the FOWLP process having such advantages to the optical interconnection module, it may be necessary to have a structure of devices and components mounted to suit the FOWLP process. In the FOWLP process, there is an epoxy molding process in which a plastic epoxy material is melted and then cured for sealing in order to ensure electrical and mechanical stability of devices and components. This is called an Epoxy Molding Compound (EMC) process.

FIG. 1 illustrates a typical FOWLP packaging process. The illustrated process is a chip-first and die face-down type FOWLP process, and steps of the process are briefly described as follows.

Step 1) Place the electronic device and the optical device with proven performance using a pick and place device on a predetermined location on a temporary wafer (or carrier) on which an adhesive layer is formed.

Step 2) Perform the epoxy molding process on the electronic and optical devices fixed through curing of the adhesive layer.

Step 3) Remove the temporary wafer from the electronic and optical devices on which the epoxy molding process has been performed, form a dielectric layer on the removed area, and then form a ReDistribution Layer (hereinafter, also referred to as RDL) on the formed dielectric layer.

Step 4) Perform dicing for division into individual package forms.

As can be seen from the FOWLP process, an electrical connection between chips may be made through the polymer dielectric and copper wiring process with no bonding wire process, and in the case of implementing the optical interconnection module by this, it is possible to ensure lightness, thinness, and compactness of the chip, signal integrity, and high yield in mass production.

The optical interconnection module provided by one or more example embodiments requires not only the electrical connection between the chips, but also input/output (optical coupling) of optical signals. In this case, an area for optical coupling of a photonics chip for optical transmission and reception of the optical interconnection module should not be contaminated during the FOWLP process.

During the epoxy molding process of the aforementioned FOWLP process, liquid epoxy may penetrate into and contaminate the optical coupling area of the silicon photonics-based photonics chip for optical transmission and reception. Further, generally, in the FOWLP process, since the EMC surrounds the entire optical interconnection module, it is difficult to arrange an input/output (optical coupling) port of an optical signal on the side.

Furthermore, the packaging process of the first-chip and die face-down type is applied during the FOWLP process, and a pad, which is an electrical connection part of the electronic device and the optical device, faces the floor. The bottom surface of the electronic device used in this case is often connected to an electrical ground, and may be used as a path for dissipating heat generated from the electronic device.

Therefore, in order to solve electrical, optical, and thermal issues expected in the case that the FOWLP process is applied to the optical interconnection module, example embodiments may provide a structure of an electronic chip consisting of an active device and a passive device, and a structure of a photonics chip consisting of a silicon photonics-based optical device, and provide a structure of a package substrate applicable according to the structure of the optical interconnection module.

Figure 2:
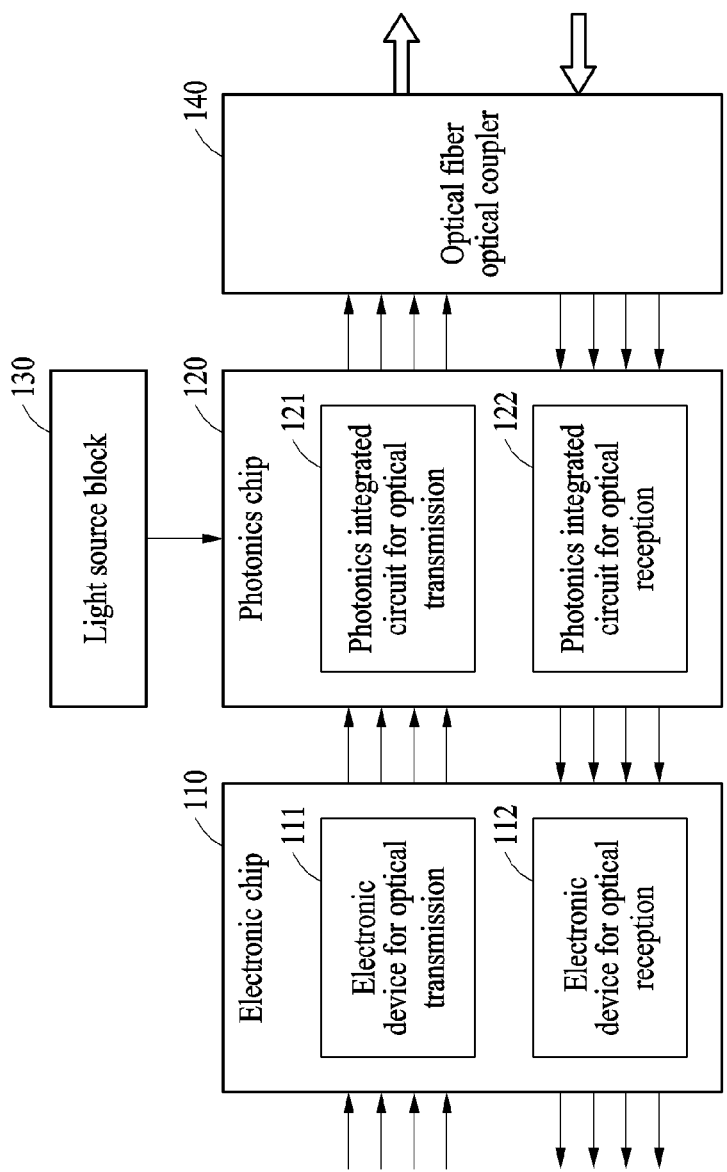
FIG. 2 is a diagram illustrating a configuration of an optical interconnection module according to an example embodiment.

FIG. 2 is a diagram illustrating a configuration of an optical interconnection module according to an example embodiment.

Referring to FIG. 2, an optical interconnection module 100 may include an electronic chip 110 including an active device and a passive device, a photonics chip 120 including a silicon photonics-based optical device, a light source block 130, and an optical fiber optical coupler 140 for optical transmission and reception.

An optical transmitter may include an electronic device for optical transmission 111, a photonics integrated circuit for optical transmission 121, and the light source block 130. In this case, the electronic device for optical transmission 111 may include chips such as a driver IC, a clock and data recovery circuit (CDR), and a digital signal processor (DSP), according to the configuration of the optical interconnection module 100.

Further, the photonics integrated circuit for optical transmission 121 is implemented based on silicon photonics, and may include an optical modulator, an optical multiplexer, and various other passive devices.

The light source block 130 may supply an optical signal through a light source having a continuous light source, a pulsed light source, and other specific functions (for example, a pulsed light signal generating function for generating periodic optical signals) according to the configuration and function of the optical interconnection module 100. The light source block 130 may be heterogeneously integrated into the photonics chip 120 or implemented in the form of an external independent light source module to supply the optical signal.

An optical receiver may include an electronic device for optical reception 112 and a photonics integrated circuit for optical reception 122. In this case, the electronic device for optical reception 112 may include chips such as a transimpedance amplifier (TIA), a CDR, and a DSP, according to the configuration of the optical interconnection module 100.

Further, the photonics integrated circuit for optical reception 122 is also implemented based on silicon photonics, and may include a light receiving device such as a photodiode, an optical demultiplexer, and various other passive devices.

Finally, the optical fiber optical coupler 140 may consist of a plurality of optical fibers for the optical transmitter and the optical receiver. In this case, the optical fiber optical coupler 140 may further include an optical fiber for connection with an external continuous light source in the case that the optical transmitter requires the external continuous light source.

Figure 3:
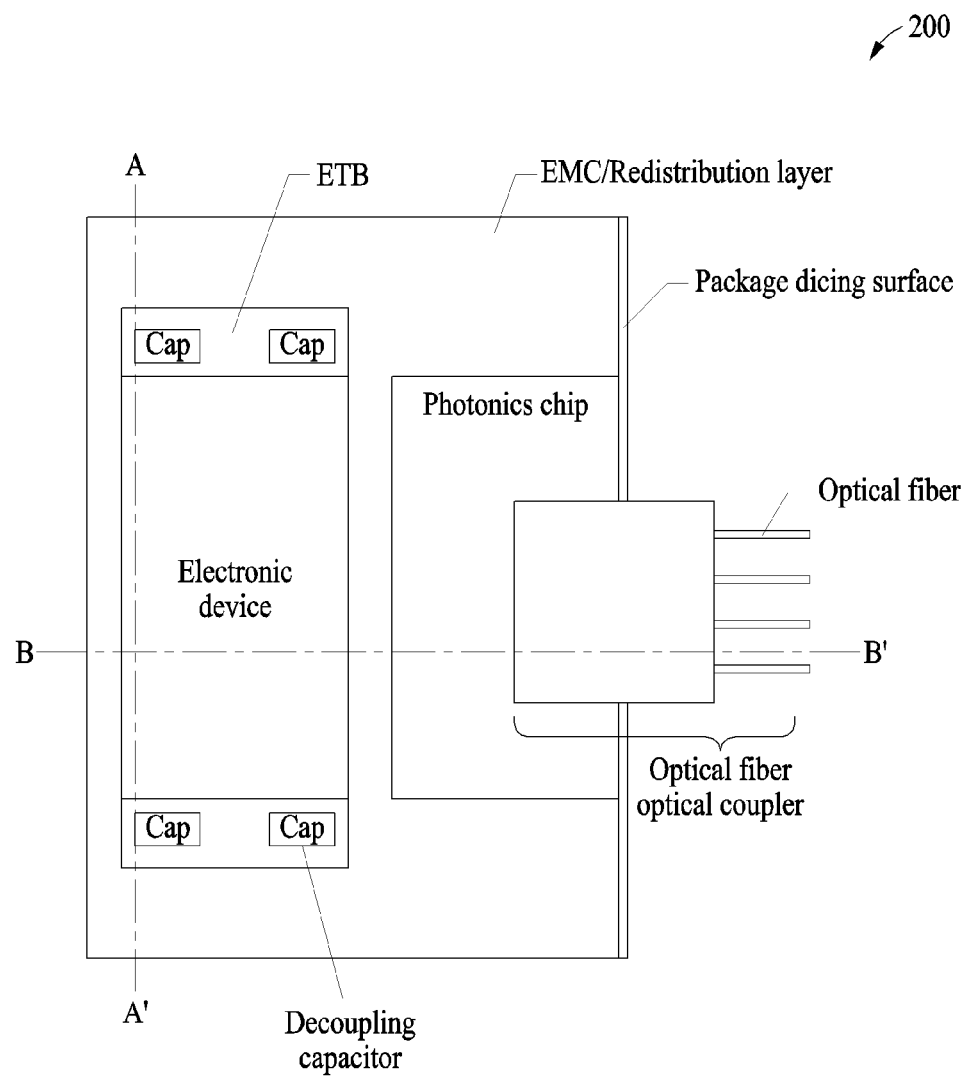
FIG. 3 is a diagram illustrating a plan view of an optical interconnection module according to a first example embodiment.

FIG. 3 is a diagram illustrating a plan view of an optical interconnection module according to a first example embodiment.

An optical interconnection module 200 may be manufactured through the FOWLP process as described above, in which it may be difficult to secure an electrical ground and a heat dissipation path of an electronic device. Further, in the case that a structure in which the optical fiber optical coupler is connected through a side of the optical interconnection module 200 is applied, it is difficult to mount the optical fiber optical coupler due to the EMC surrounding all sides of the module.

In order to solve these technical issues, according to an example embodiment, an electronic chip including an active device and a passive device and other electric passive devices (for example, decoupling capacitors) may be mounted on a specific form of electrical and thermal bench (ETB) as shown in FIG. 3. In this case, a pad portion of the mounted electronic device may face the lower portion of the optical interconnection module 200 (the direction in which the redistribution layer is disposed), and the decoupling capacitor, which is an electric passive device, may be implemented as a single layer capacitor (SLC).

The electrical and thermal bench provided in the present disclosure may be formed of, for example, a copper-tungsten alloy (CuW) material and its outermost surface may be surface-treated with gold (Au, gold), and both surfaces of the single layer capacitor may also be surface-treated with gold. The material of the electrical and thermal bench may be used in the FOWLP process (in which a copper wire is used in the redistribution layer process), and in addition to the CuW material, electrically or thermally superior metal materials may also be used.

Further, as the electrical and thermal bench provided in the present disclosure, a structure having a ceramic-based material or a silicon material having excellent thermal conductivity may also be applicable, in addition to a metal structure as described above. In addition, the electrical and thermal bench may include a structure having a thermal via in order to provide an electrical ground connection by forming a metal pattern for electrical connection on the material and to increase a heat dissipation effect additionally.

FIG. 3 provides the configuration in which the electronic device for optical transmission/reception is mounted on one electrical and thermal bench, but such a configuration is merely an example. A configuration in which the electronic device for optical transmission and the electronic device for optical reception are separately mounted on separate electrical and thermal benches may also be possible. As described above, in the case that the electronic device for optical transmission and the electronic device for optical reception are mounted on the separate electrical and thermal benches, it is possible to provide an advantage in that the electrical ground of the transmission side and the reception side can be separated.

The photonics chip including the silicon photonics-based optical device(s) provided in FIG. 3 may be disposed to be as close to the electronic chip as possible, and a groove may be formed so that the optical fiber optical coupler can be connected through the side. Although the optical interconnection module 200 of the example embodiment provides a structure in which the optical fiber optical coupler is optically coupled through an edge coupler formed on the photonics chip, such a structure is merely an example. A structure in which the optical fiber optical coupler is optically coupled through a surface coupler capable of vertical optical coupling may also be applicable.

Although the photonics chip is provided in the structure of a single chip in FIG. 3, such a structure is merely an example and photonics chips for optical transmission and optical reception may also be used.

The optical fiber optical coupler may be implemented in the form of a fiber array block (hereinafter, also referred to as FAB) for arranging a plurality of optical fibers at regular intervals. Such an optical fiber optical coupler may be implemented in a structure in which a plurality of optical fibers are directly connected to the photonics chip, or in a structure in which a plurality of optical fibers are connected to the photonics chip using a silica-based planar lightwave circuit (hereinafter, also referred to as PLC).

Figure 4:
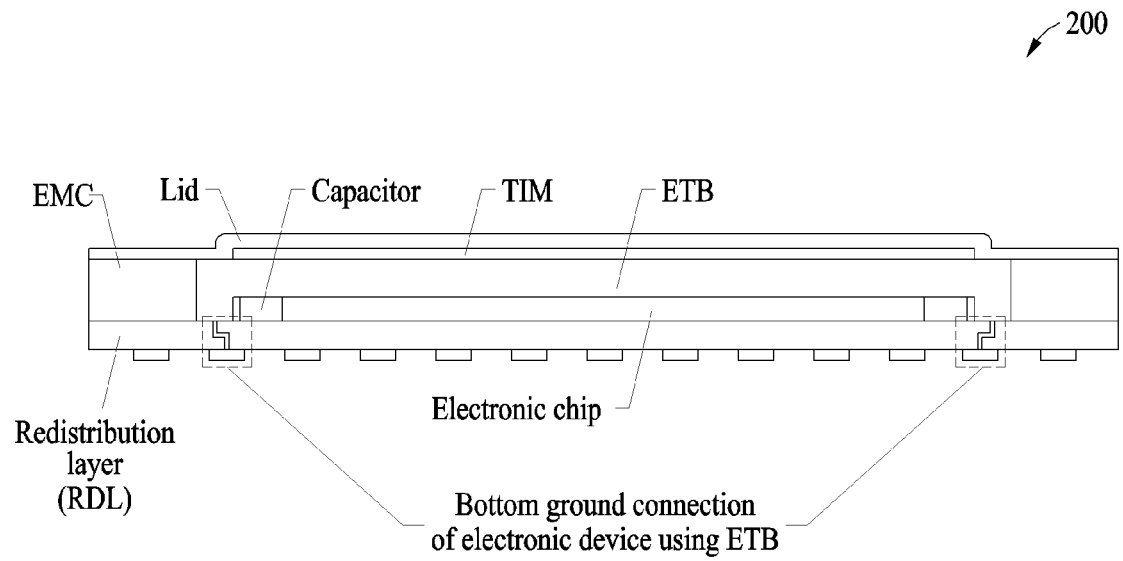
FIG. 4 is a diagram illustrating a cross section along A-A' of FIG. 3 according to the first example embodiment.

FIG. 4 is a diagram illustrating a cross section along A-A' of FIG. 3 according to the first example embodiment.

Referring to FIG. 4, in the optical interconnection module 200 of the example embodiment, a connection of the electrical ground to the electronic chip may be possible via the redistribution layer using the electrical and thermal bench. In addition, the optical interconnection module 200 may provide a heat dissipation path by disposing a thermal interface material (hereinafter, also referred to as TIM) on the upper surface of the electrical and thermal bench to minimize thermal resistance to a lid.

The RDL may be patterned through an etching process in the FOWLP process. The redistribution layer may be formed by a plating process with a metal layer and a polymer material, which is an electrically insulating dielectric layer, and may serve as electrical wiring connection within the optical interconnection module 200 by using a copper-based material providing electrical connection.

Accordingly, the optical interconnection module 200 does not require an additional bond wire process, and the total height of the RDL is generally approximately 50 µm or less in the case of two-layer metal (copper) wiring. Thus, as the electrical connection distance in the vertical direction is considerably shortened, there is an advantage in that signal loss for a high-speed electrical signal is small.

Further, a material capable of minimizing thermal resistance may be applied to the thermal interface material (TIM) of the optical interconnection module 200, and the TIM may be formed of a material having an electrical insulation property against a metal lead. This is to separate the ground of the optical interconnection module 200 from the ground of the external system, and as shown in FIG. 4, the outside of the optical interconnection module 200 may be sealed by being surrounded by cured epoxy called EMC.

Figure 5:
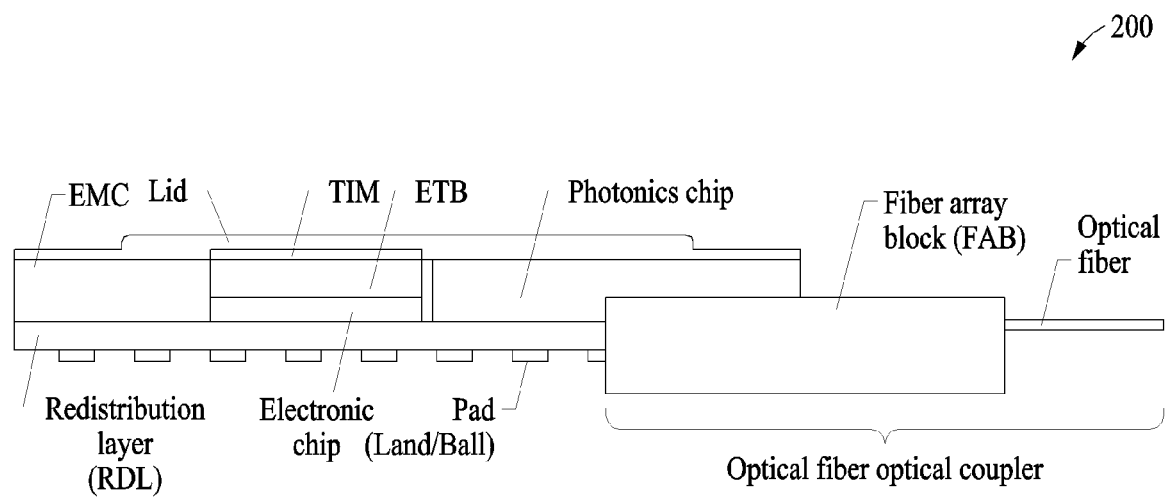
FIG. 5 is a diagram illustrating a cross section along B-B' of FIG. 3 according to the first example embodiment.

FIG. 5 is a diagram illustrating a cross section along B-B' of FIG. 3 according to the first example embodiment.

Referring to FIG. 5, the photonics chip of the optical interconnection module 200 of the example embodiment may be disposed as close as possible to the electronic chip mounted on the electrical and thermal bench. Here, a groove may be formed in the photonics chip of the optical interconnection module 200 such that the photonics chip is suitable for the FOWLP process, and when the EMC process and the RDL process are completed, a dicing process may be performed to separate out each optical interconnection module 200.

The optical interconnection module 200 may be subjected to the dicing process such that one side of the groove formed in the photonics chip, in other words, the side to which the optical fiber optical coupler is connected, is open. By this dicing process, a portion of the photonics chip that prevents the liquid epoxy from penetrating during the EMC process may be removed.

Thereafter, an optical fiber optical coupler may be connected to the optical interconnection module 200 through the open side of the photonics chip after the dicing process, as shown in FIG. 5.

Figure 6:
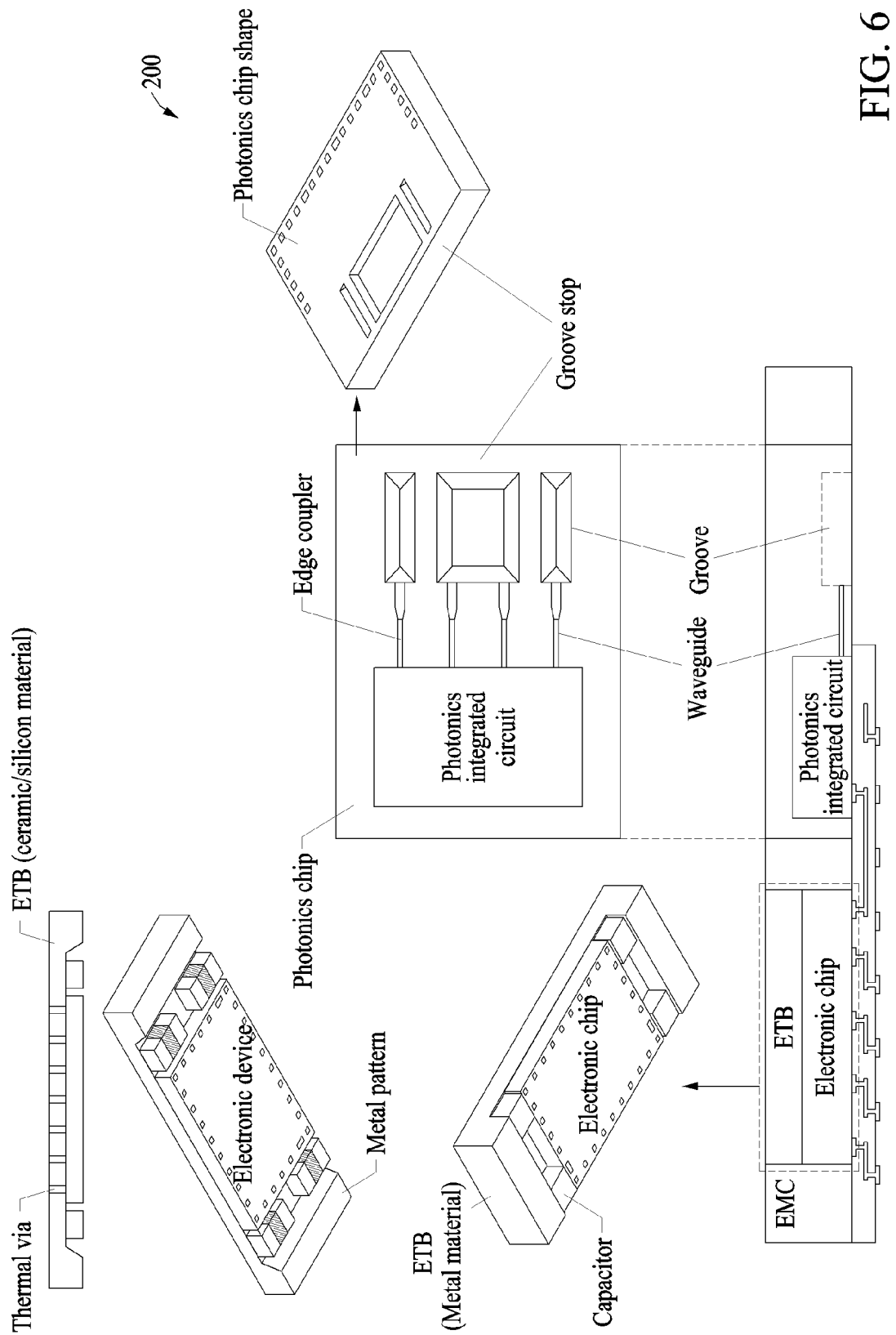
FIG. 6 is a diagram illustrating a structure and shapes of core components of the optical interconnection module applied to a FOWLP process according to the first example embodiment.

FIG. 6 is a diagram illustrating a structure and shapes of core components of the optical interconnection module applied to the FOWLP process according to the first example embodiment.

Referring to FIG. 6, in the optical interconnection module 200 of the example embodiment, the electronic chip consisting of the optical transmission/reception electronic devices and the decoupling capacitors used in the electronic devices may be mounted on the electrical and thermal bench. In FIG. 6, the electrical and thermal bench may have a '⊂' shape, and the heights of both sides may be the same as the heights of the mounted electronic devices and capacitors. However, the shape of the electric and thermal bench is merely an example and may be simply implemented in a plate type depending on the electronic device to be mounted, and a surface mount device (SMD) may be used as the decoupling capacitor rather than the SLC.

Here, a conductive material (for example, silver epoxy) may be disposed on lower surfaces of the electronic chip consisting of the optical transmission/reception electronic devices, the decoupling capacitors used in the electronic devices, and other passive electronic devices, which are mounted on the electrical and thermal bench. This is to provide electrical ground connections and heat dissipation paths for the electronic chip consisting of the optical transmission/reception electronic devices, the decoupling capacitors used in the electronic devices, and other passive electronic devices.

Here, as shown in FIG. 6, the pad portion of the electronic chip mounted on the electrical and thermal bench may face the lower portion of the optical interconnection module 200 (the direction in which the redistribution layer is disposed). In this case, as shown in FIG. 6, for the electrical and thermal bench, an electrically insulating material having excellent thermal conductivity, such as a ceramic-based material or a silicon material, may be used in addition to the metal material. The electrical and thermal bench may provide electrical connection (such as the ground) by metal patterning on the electrically insulating material, and the thermal via for securing an additional heat dissipation path may be formed.

The photonics chip may include a photonics integrated circuit for optical transmission and reception, and an edge coupler may be disposed to optically couple the photonics integrated circuit to the outside. The edge coupler is a type of optical coupler required for optical coupling from one side of the optical interconnection module 200.

During the EMC process of the FOWLP process provided in the present disclosure, the liquid epoxy may penetrate into and contaminate the edge coupler. In order to arrange the optical fiber optical coupler on the side of the optical interconnection module 200, an end region of the edge coupler (a groove region) must be clearly secured without contamination.

To this end, in the present disclosure, a groove having four sides closed may be formed in the end region of the edge coupler of the photonics chip. In the present disclosure, as shown in FIG. 6, a groove stop region may exist between the groove region of the photonics chip and the epoxy molding to prevent the liquid epoxy from penetrating into the edge coupler.

In the present disclosure, when the EMC process is completed by applying the above-described electrical and thermal bench and photonics chip structures, the RDL process, which is an electrical wiring connection process, may be performed. In this case, the edge coupler and the groove region may be clearly secured through open processing such that they are not contaminated by other materials in the RDL process according to the present disclosure.

As the final process of the FOWLP process provided in the present disclosure, the dicing process may be performed. The dicing process is a process for separating out each optical interconnection module 200, and the groove stop region of the photonics chip may be determined as a dicing position.

Figure 7:
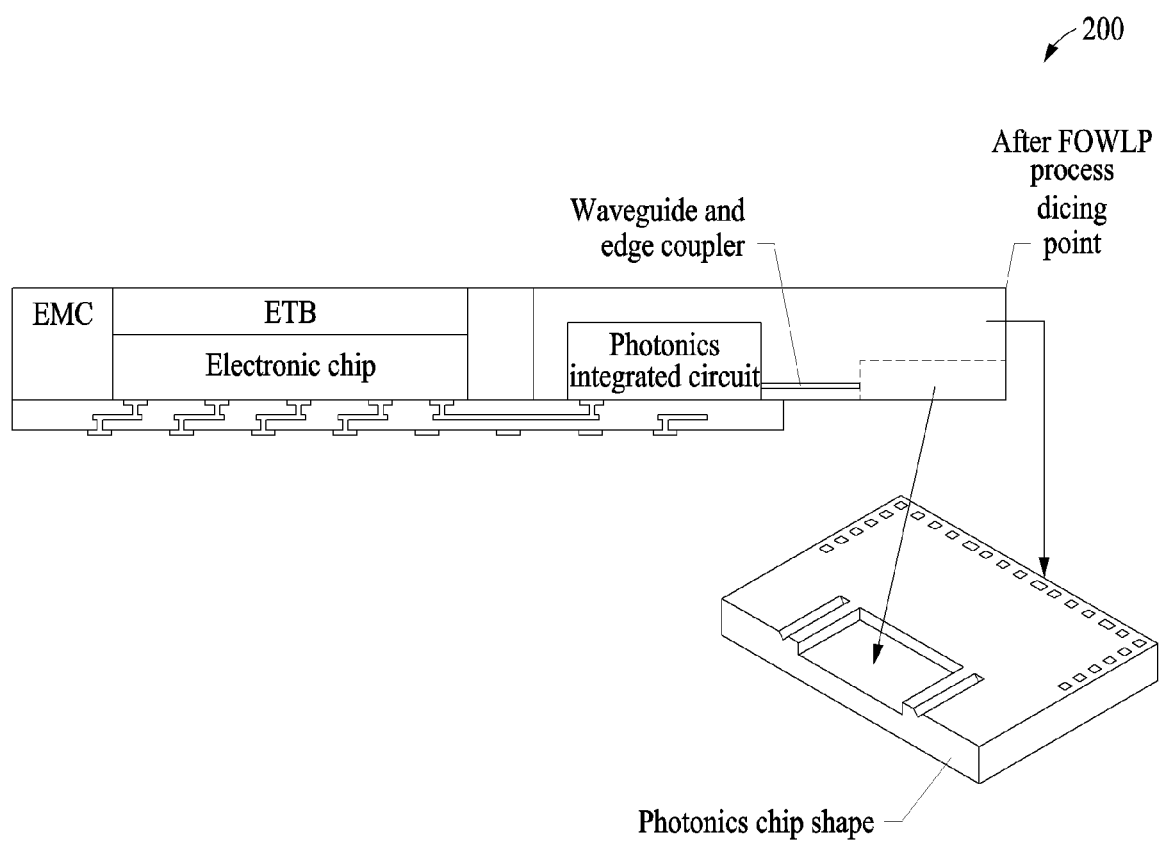
FIG. 7 is a diagram illustrating a structure and shapes of the core components of the optical interconnection module after a dicing process according to the first example embodiment.

FIG. 7 is a diagram illustrating a structure and shapes of the core components of the optical interconnection module after the dicing process according to the first example embodiment.

The optical interconnection module 200 of the present disclosure from which the groove stop region has been removed by the dicing process may have a shape in which one side of the groove of the photonics chip is opened. In other words, the optical interconnection module 200 of the present disclosure may have a shape in which the epoxy molding of the side to which the optical fiber optical coupler is connected is removed by the dicing process.

Then, in the present disclosure, the optical fiber optical coupler may be connected through the open side of the photonics chip. In this case, V-grooves for optical alignment may be disposed on both sides of one large groove for connecting optical fibers of a plurality of channels in the photonics chip, and the optical fiber optical coupler may be connected to the open side of the photonics chip by using the V-grooves for optical alignment.

Although not shown in FIG. 7, in the present disclosure, when the groove of the photonics chip is formed, one side may be made in an open shape, and a polymer material having solubility in a specific solvent such as a photoresist may be embedded in the grooved portion, and then the EMC process may be performed. Then, in the RDL process of the present disclosure, by performing the dicing process to a level at which the epoxy molding present on one side of the photonics chip can be removed after dissolving and cleanly removing the photoresist embedded in the groove, it is possible to process the one side of the photonics chip to be open.

Figure 8:
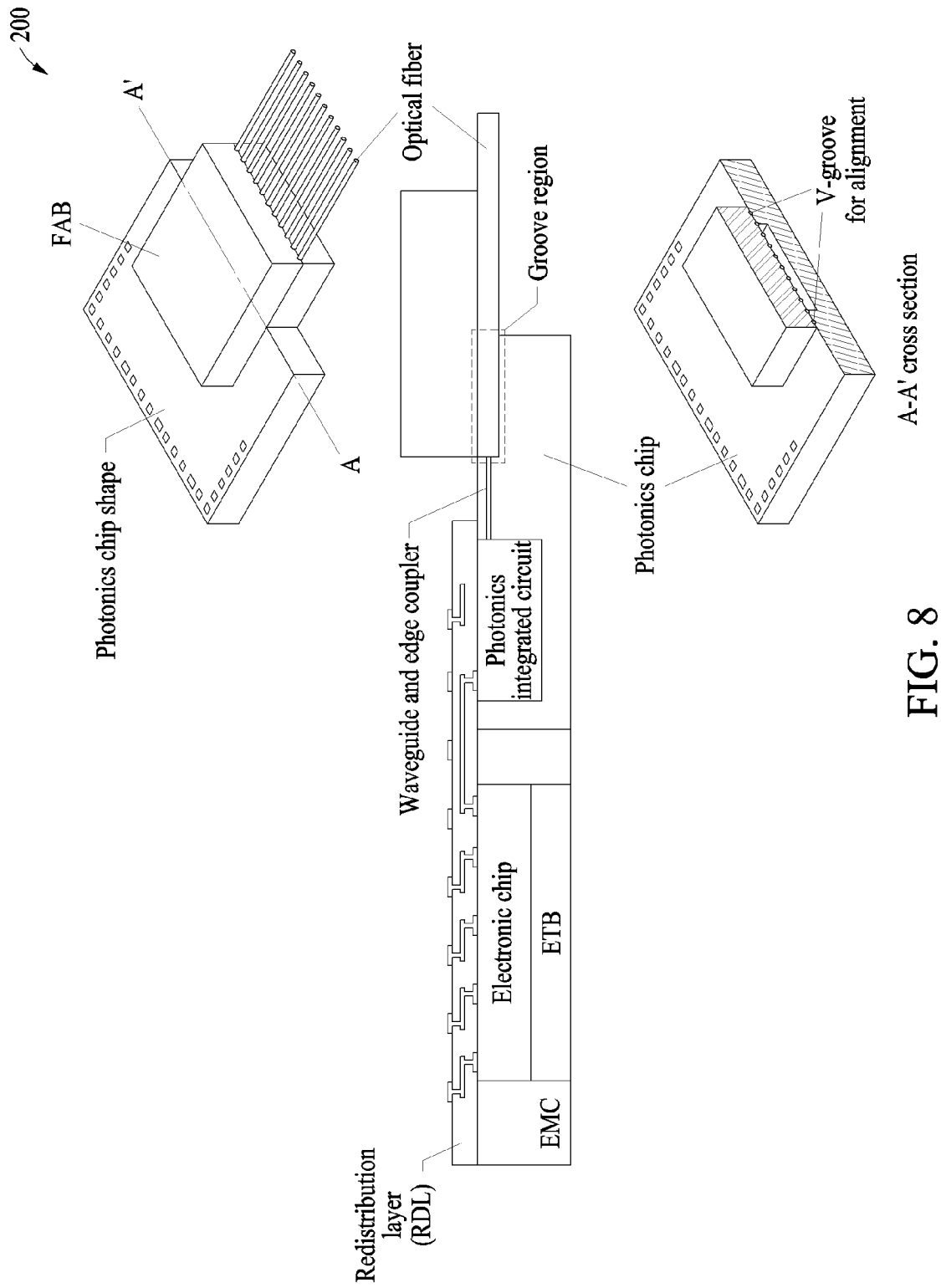
FIG. 8 is a diagram illustrating a shape in which an optical fiber optical coupler is connected after the dicing process according to the first example embodiment.

FIG. 8 is a diagram illustrating a shape in which the optical fiber optical coupler is connected after the dicing process according to the first example embodiment.

Referring to FIG. 8, by connecting the FAB of the optical fiber optical coupler to the one side of the photonics chip open through the dicing process, the highly integrated optical interconnection module 200 may be completed. In this case, according to the present disclosure, the optical fiber may be disposed at a predetermined position by the V-grooves for optical alignment formed in quartz or silicon of the optical fiber optical coupler.

In the present disclosure, channels other than the channels corresponding to the V-shaped grooves for optical alignment disposed on both sides may be mounted using a deep trench type groove formed widely in the photonics chip. In this case, the optical fiber used in the present disclosure may be selected and used to match characteristics of the edge coupler applied to the photonics chip.

Figure 9:
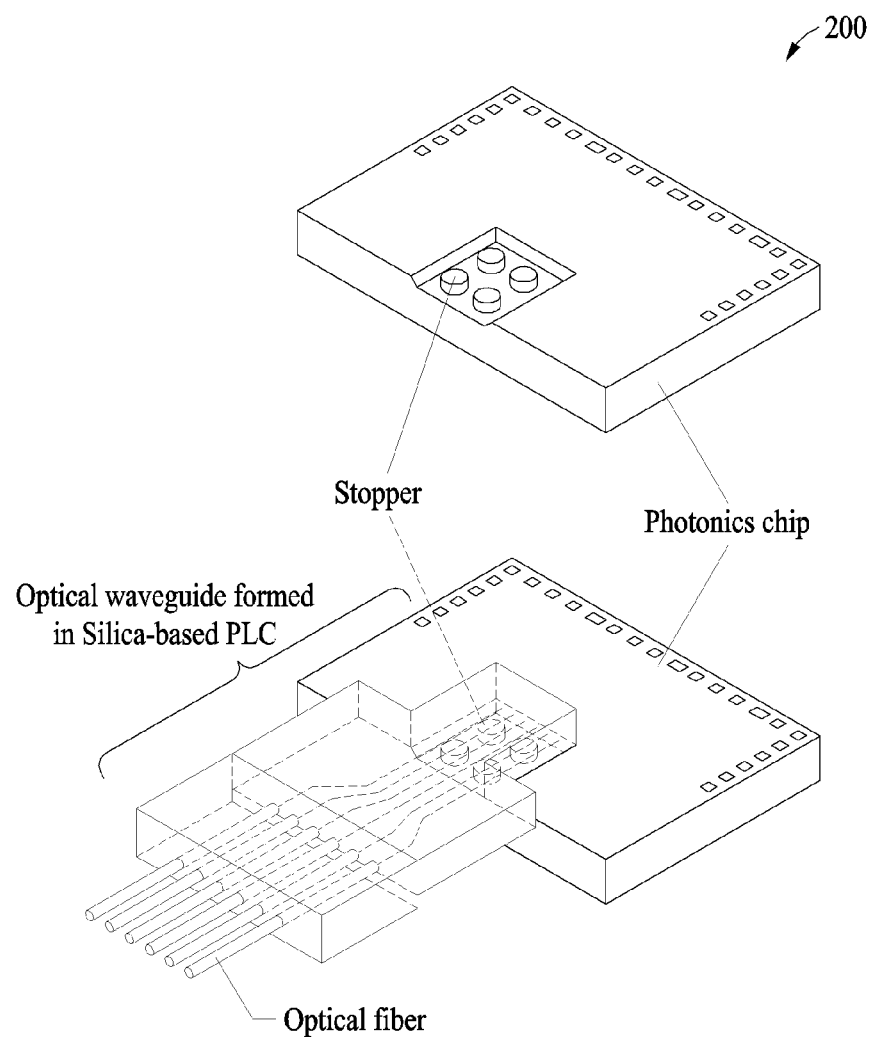
FIG. 9 is a diagram illustrating a structure of the optical fiber optical coupler to which a silica-based planar optical waveguide is applied according to the first example embodiment.

FIG. 9 is a diagram illustrating a structure of the optical fiber optical coupler to which the silica-based planar lightwave circuit is applied according to the first example embodiment.

The optical fiber optical coupler of the silica-based PLC structure provided in the present disclosure is advantageous in that an optical waveguide of a plurality channels can be formed with very accurate positions. The photonics chip has the groove stop region as shown in FIG. 6, and one side of the photonics chip may be opened by the dicing process as shown in FIG. 7.

In this case, the present disclosure may provide an easy optical alignment packaging process with the optical fiber optical coupler of the silica-based PLC structure by forming stoppers on the photonics chip for a reference point for vertical alignment.

Figure 10:
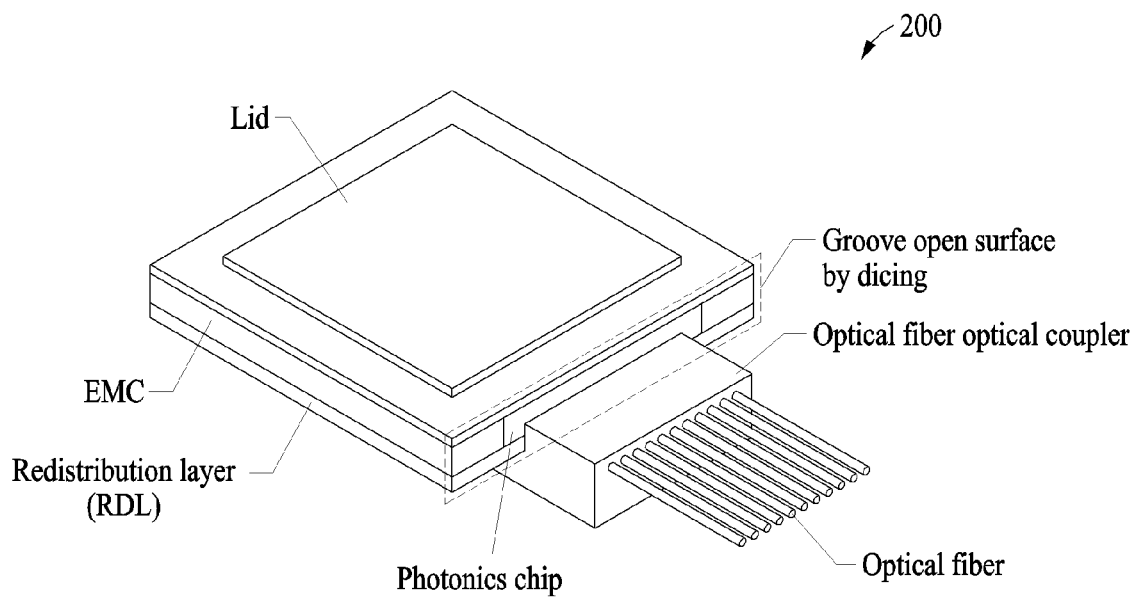
FIG. 10 is a diagram illustrating a final shape of the optical interconnection module according to the first example embodiment.
Figure 10:
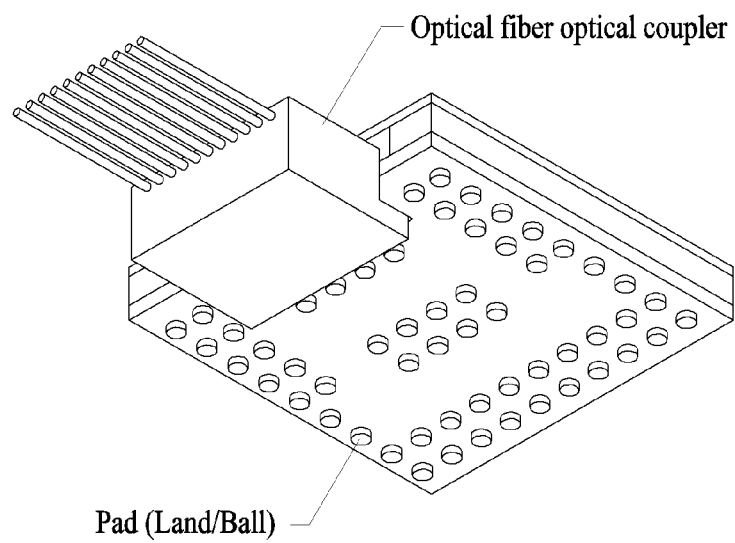

FIG. 10 is a diagram illustrating a final shape of the optical interconnection module according to the first example embodiment.

FIG. 10 shows the highly integrated optical interconnection module 200 completed by arranging the TIM and the lid for heat dissipation of the electronic devices after the optical fiber optical coupler is connected to the open side of the photonics chip through the FOWLP process according to the first example embodiment. In this case, pads (lands or balls) for electrical connection to a package substrate may be formed on the lower surface of the optical interconnection module 200.

Referring to FIG. 10, in the present disclosure, the epoxy molding existing on the side surface of the optical interconnection modules 200 to which the optical fiber optical coupler is connected is removed, so that a cross section of the photonics chip may be exposed. In addition, the present disclosure applies a structure in which the optical interconnection module 200 is directly connected to the package substrate via the RDL in order to minimize the distance of a high-speed electrical signal path of the optical interconnection module 200 using the FOWLP process, and accordingly, the optical fiber optical coupler may be disposed at the lower portion of the optical interconnection module 200.

The package substrate to which the highly integrated optical interconnection module 200 as described above is applied may have an external feature implemented such that no physical interference occurs in consideration of the arrangement of the optical fiber optical coupler.

Figure 11:
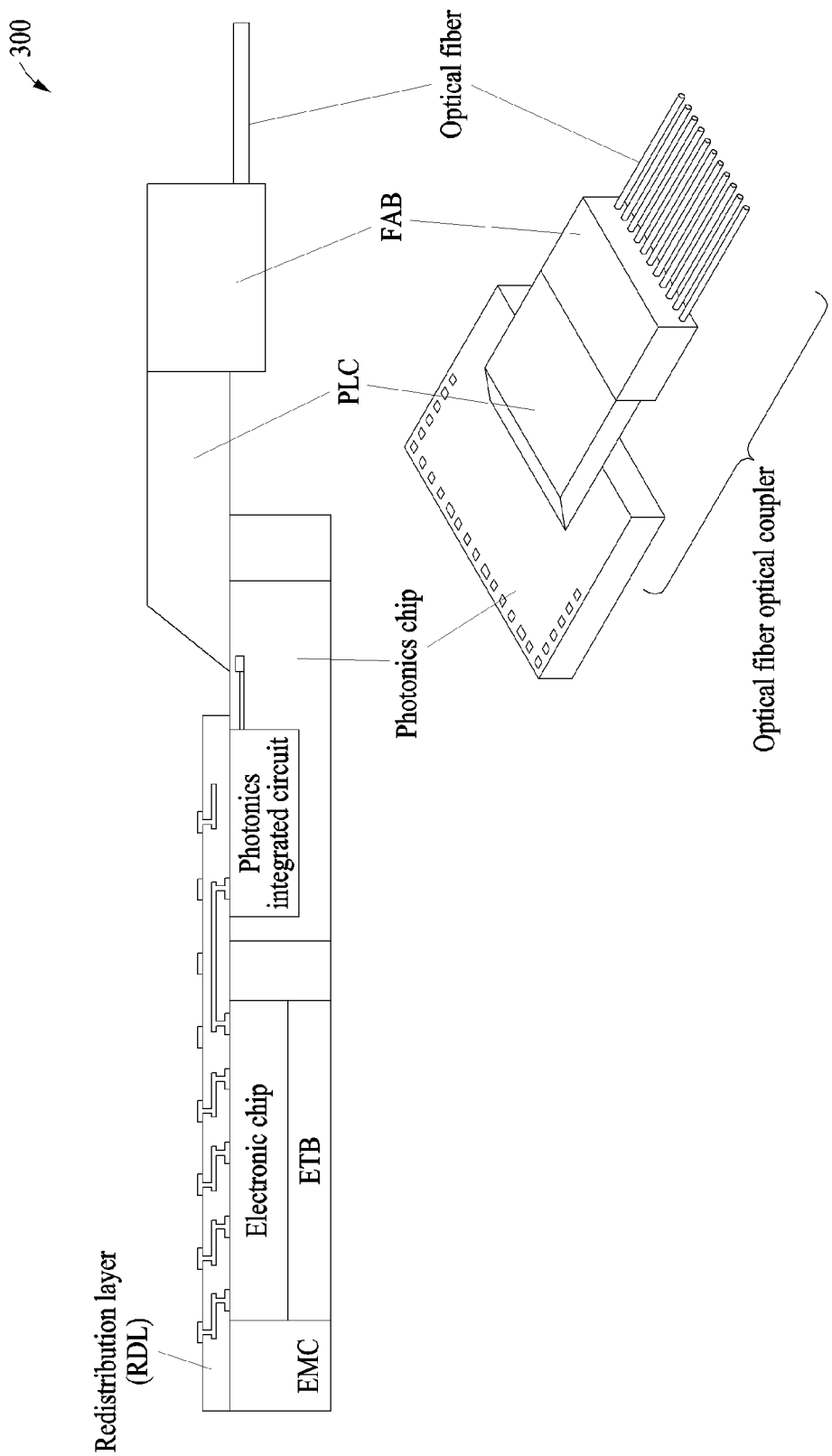
FIG. 11 is a diagram illustrating a structure and shape of an optical interconnection module according to a second example embodiment.

FIG. 11 is a diagram illustrating a structure and shape of an optical interconnection module according to a second example embodiment.

Unlike the first example embodiment, an optical interconnection module 300 according to the second example embodiment provides a structure in which an optical fiber optical coupler is connected to one surface of the photonics chip (in the direction in which the redistribution layer is disposed). Accordingly, there is no need for the groove region or the like of the photonics chip presented in the first example embodiment, and there is no need to remove one side of the photonics chip by the dicing process.

More specifically, the optical fiber optical coupler may be optically coupled toward the upper surface of the photonics chip by a surface coupler (for example, a grating coupler) implemented on the photonics chip. In this case, the optical fiber optical coupler may have a form in which an optical fiber is connected to an optical waveguide of the silica-based PLC structure or may consist of only a multi-channel optical fiber array.

The silica-based PLC structure optical fiber optical coupler has a fairly small position error between channels of the optical waveguide (an error level of ~0.1 um, which may vary depending on process conditions), and may provide the advantage of making the distance between the channels of the optical waveguide down to tens of Here, a reflective surface of the optical fiber optical coupler should be formed such that reflected input/output angle is approximately 8°~11° to satisfy the optical coupling condition of the surface coupler implemented on the photonics chip. The optical fiber optical coupler consisting of only of the multi-channel optical fiber array should have a reflective surface formed at the same level as above.

Figure 12:
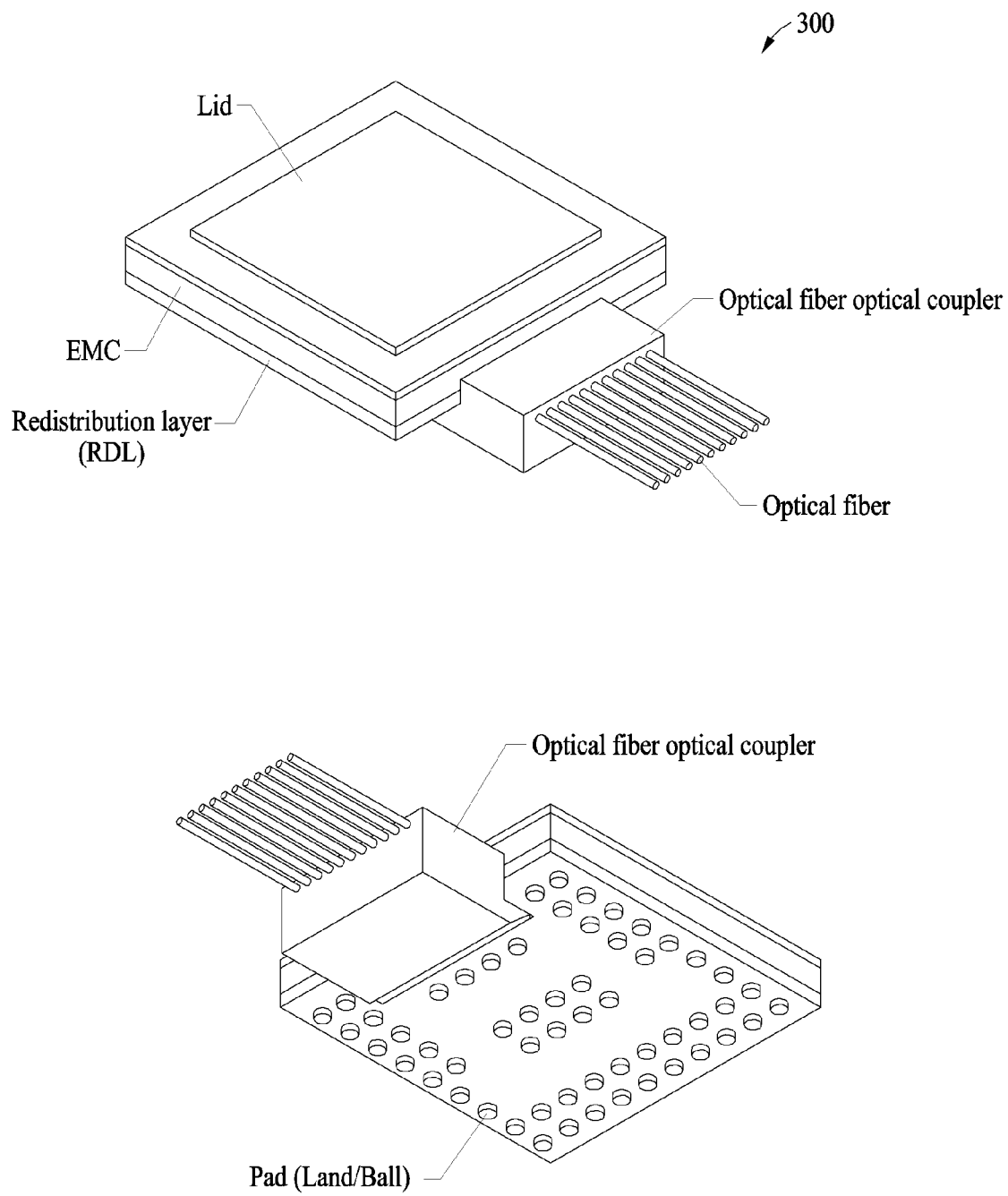
FIG. 12 is a diagram illustrating a final shape of the optical interconnection module according to the second example embodiment.

FIG. 12 is a diagram illustrating a final shape of the optical interconnection module according to the second example embodiment.

FIG. 12 shows a highly integrated optical interconnection module 300 completed by disposing a thermal interface material (TIM) and a lid for heat dissipation of electronic devices after connecting the optical fiber optical coupler to one surface of the photonics chip (in the direction in which the redistribution layer is disposed) through a FOWLP process according to the second example embodiment.

As the optical fiber optical coupler is connected to the surface of the photonics chip as shown in FIG. 12, there is no need to remove one side of the optical interconnection module 300 surrounded by the epoxy molding through the dicing process. Accordingly, unlike the first example embodiment, four surfaces of the optical interconnection module 300 are surrounded by the epoxy molding, so that one side of the photonics chip is not exposed.

In addition, the present disclosure applies a structure in which the optical interconnection module 300 is directly connected to a package substrate via the RDL in order to minimize the distance of a high-speed electrical signal path of the optical interconnection module 300 using the FOWLP process, and accordingly, the optical fiber optical coupler may be disposed at the lower portion of the optical interconnection module 300, similar to the first example embodiment.

As in the first example embodiment, the package substrate to which the highly integrated optical interconnection module 300 as described above is applied may have an external feature ('⊂'-shaped groove) implemented such that no physical interference occurs in consideration of the arrangement of the optical fiber optical coupler.

Figure 13:
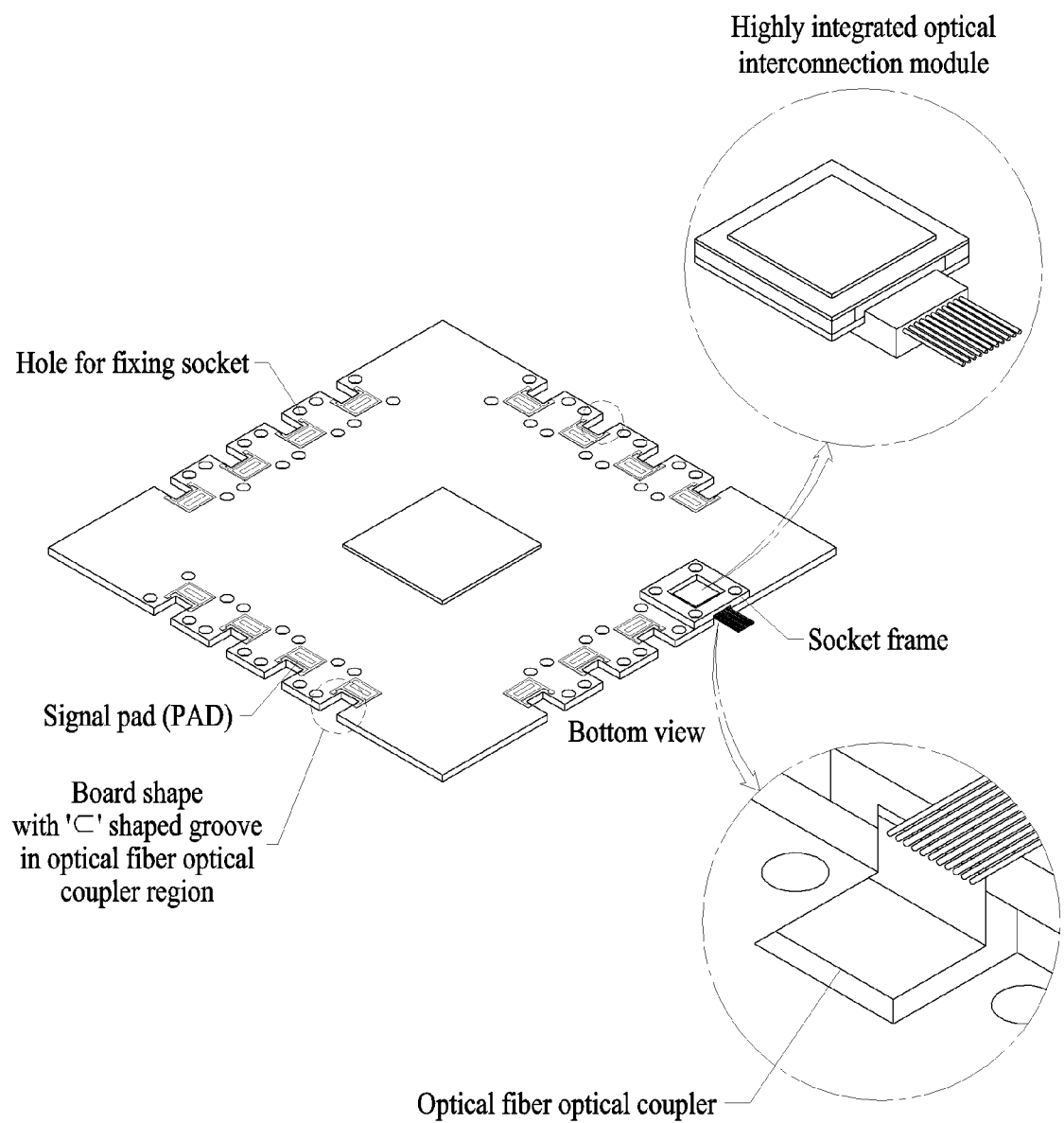
FIG. 13 is a diagram illustrating an application example of a highly integrated optical interconnection module according to a third example embodiment.

FIG. 13 is a diagram illustrating an application example of a highly integrated optical interconnection module according to a third example embodiment.

The high-integration optical interconnection modules 200 and 300 implemented by the first and second example embodiments are mounted on the package substrate on which a host chip is mounted, so that high-speed optical connection between chips and between boards can be configured. In this case, the host chip may be a high-speed large-capacity switching chip or an electronic chip handling high-speed input/output signals equivalent thereto.

Referring to FIG. 13, in the case that the highly integrated optical interconnection module 200 or 300 is in the form of a Land Grid Array (LGA), an electrical connection to the package substrate may be made through a socket. This is an electrical connection method by physical contact. Therefore, although not shown in FIG. 13, the electrical connection may be made through a socket lid capable of applying a vertical physical force to an upper side surface of the optical interconnection module 200 or 300. On the other hand, in the case that the highly integrated optical interconnection module 200 or 300 is in the form of a ball grid array (BGA), a structure in which it is directly connected to the package substrate by soldering may be applied.

A hole for the socket and a signal pad may be formed in the package substrate, and as the optical fiber optical coupler of the highly integrated optical interconnection module 200 or 300 is disposed below the substrate, the outer edge may be processed into a '⊂' shape to prevent physical interference.

In addition, as seen from the bottom view of the package board, the highly integrated optical interconnection module 200 or 300 may be mounted without physical interference with the optical fiber optical coupler by processing the outer shape of the package substrate to be recessed. In other words, the package board provided in FIG. 13 has a package substrate structure advantageous in the case that the optical fiber optical coupler is disposed at the bottom such as the optical interconnection modules 200 and 300 provided in the present disclosure.

The components described in the example embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The methods according to example embodiments may be embodied as a program that is executable by a computer and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers. A computer program(s) may be written in any form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM). A processor and a memory may be supplemented by, or integrated into, a special purpose logic circuit.

Also, non-transitory computer-readable media may be any available media that may be accessed by a computer and may include both computer storage media and transmission media.

The present specification includes details of a number of specific implements, but it should be understood that the details do not limit any invention or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

It should be understood that the example embodiments disclosed herein are merely illustrative and are not intended to limit the scope of the invention. It will be apparent to one of ordinary skill in the art that various modifications of the example embodiments may be made without departing from the spirit and scope of the claims and their equivalents.

What is claimed is:

1. A method for manufacturing an optical interconnection module in which an optical fiber optical coupler is disposed at its lower portion using a Fan-Out Wafer-Level Packaging (FOWLP) process, the method comprising:
    mounting an electronic chip on an electrical and thermal bench (ETB) disposed only in a first area on a temporary wafer on which an adhesive layer is formed;
    mounting a photonics chip in a second area on the temporary wafer, wherein the second area is separated from the first area and is coplanar with the first area, and the photonics chip has a groove region formed on its bottom surface, facing a ReDistribution Layer (RDL), to allow the optical fiber optical coupler to be inserted into and placed in the groove region located at the lower portion of the optical interconnection module;
    performing an epoxy molding compound (EMC) process on the electronic chip and the photonics chip mounted on the temporary wafer;
    after removing the temporary wafer from the electronic chip and the photonics chip on which the EMC process has been performed and forming a dielectric layer in the removed region, forming the ReDistribution Layer (RDL) on the formed dielectric layer;
    opening a side of the photonics chip on which the EMC process has been performed by performing dicing using the groove region formed in the photonics chip; and
    connecting the optical fiber optical coupler to the open side of the photonics chip, wherein the ETB has a concave shape for the electronic chip to be mounted therein, with a height of both sides of the ETB being a same as a height of the mounted electronic chip, wherein regions of the RDL in contact with both sides of the ETB include metal patterns extending to pads, thereby providing an electrical ground for the electronic chip mounted on the ETB.

2. The method of claim 1, wherein the mounting of the electronic chip comprises mounting an electronic chip belonging to an optical transmitter on an ETB, and mounting an electronic chip belonging to an optical receiver on another ETB.

3. The method of claim 1, wherein the ETB on which the electronic chip is mounted provides a heat dissipation path for the electronic chip through a thermal interface material (TIM) disposed on an opposite side of the RDL with the ETB in between.

4. The method of claim 1, wherein the forming of the RDL comprises forming the RDL such that the groove region and an edge coupler included in the photonics chip are opened in bottoms of the electronic chip and the photonics chip on which the EMC process has been performed.

5. The method of claim 1, wherein the mounting of the photonics chip comprises forming the groove region with all sides closed in an end region of an edge coupler included in the photonics chip and mounting the photonics chip having the groove region.

6. The method of claim 5, wherein the opening of the side of the photonics chip comprises opening one side of the groove region by dicing to remove a groove stop region between the groove region with all the sides closed and an epoxy molding surrounding the photonics chip.

7. The method of claim 1, wherein the mounting of the photonics chip comprises:

forming a groove region with one side open in an end region of an edge coupler included in the photonics chip; and embedding a polymer material having solubility in a predetermined solvent in the formed groove region and mounting the photonics chip having the groove region.

8. The method of claim 7, wherein the opening of the side of the photonics chip comprises opening one side of the groove region by dicing to remove an epoxy molding existing on the one side of the groove region from which the polymer material is removed during the forming of the RDL.

9. The method of claim 1, wherein the connecting of the optical fiber optical coupler comprises connecting the optical fiber optical coupler to the open side of the photonics chip by using V-grooves for optical alignment existing on both sides of the groove region formed in the photonics chip.

10. The method of claim 1, wherein the optical fiber optical coupler is implemented as a fiber array block (FAB) in which a plurality of optical fibers are arranged at regular intervals or as a silica-based planar lightwave circuit (PLC).

11. The method of claim 1, further comprising:

disposing a thermal interface material (TIM) and a lid for heat dissipation of the electronic chip in an optical interconnection module to which the optical fiber optical coupler is connected.

12. A method for manufacturing an optical interconnection module in which an optical fiber optical coupler is disposed at its lower portion using a Fan-Out Wafer-Level Packaging (FOWLP) process, the method comprising:

mounting an electronic chip on an electrical and thermal bench (ETB) disposed only in a first area on a temporary wafer on which an adhesive layer is formed;

mounting a photonics chip in a second area on the temporary wafer, the second area being separated from the first area and being coplanar with the first area;

performing an epoxy molding compound (EMC) process on the electronic chip and the photonics chip mounted on the temporary wafer;

after removing the temporary wafer from the electronic chip and the photonics chip on which the EMC process has been performed and forming a dielectric layer in the removed region, forming a ReDistribution Layer (RDL) on the formed dielectric layer; and connecting an optical fiber optical coupler toward a bottom surface of the photonics chip using a surface coupler included in the photonics chip, wherein the optical fiber optical coupler is partially placed on the bottom surface of the photonics chip at the lower portion of the optical interconnection module, the bottom surface facing the RDL, wherein the ETB has a concave shape for the electronic chip to be mounted therein, with a height of both sides of the ETB being a same as a height of the mounted electronic chip, wherein regions of the RDL in contact with both sides of the ETB include metal patterns extending to pads, thereby providing an electrical ground for the electronic chip mounted on the ETB.

13. The method of claim 12, wherein the mounting of the electronic chip comprises mounting an electronic chip belonging to an optical transmitter on an ETB, and mounting an electronic chip belonging to an optical receiver on another ETB.

14. The method of claim 12, wherein the ETB on which the electronic chip is mounted provides a heat dissipation path for the electronic chip through a thermal interface material (TIM) disposed on an opposite side of the RDL with the ETB in between.

15. The method of claim 12, wherein the forming of the RDL comprises forming the RDL such that a groove region and an edge coupler included in the photonics chip are opened in bottoms of the electronic chip and the photonics chip on which the EMC process has been performed.

16. The method of claim 12, wherein the optical fiber optical coupler is implemented as a fiber array block (FAB) in which a plurality of optical fibers are arranged at regular intervals or as a silica-based planar lightwave circuit (PLC).

17. The method of claim 12, further comprising:

disposing a thermal interface material (TIM) and a lid for heat dissipation of the electronic chip in an optical interconnection module to which the optical fiber optical coupler is connected.

* * * * *